US006235371B1

(12) United States Patent
Mitsuhashi et al.

(10) Patent No.: US 6,235,371 B1
(45) Date of Patent: May 22, 2001

(54) POLYETHYLENE-2,6-NAPHTHALATE FILM FOR CAPACITOR

(75) Inventors: Katsuzo Mitsuhashi; Koji Kubota, both of Shiga-ken (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 0 days.

(21) Appl. No.: 09/456,754

(22) Filed: Dec. 8, 1999

(30) Foreign Application Priority Data

Dec. 10, 1998 (JP) .................................................. 10-351122

(51) Int. Cl.⁷ .............................. B32B 1/00; B32B 27/36
(52) U.S. Cl. .......................... 428/141; 428/480; 428/458; 528/308; 361/323
(58) Field of Search ....................................... 428/141, 458, 428/480, 910, 694 TR, 694 ST, 694 SG; 528/308; 361/323, 301.1

(56) References Cited

U.S. PATENT DOCUMENTS

| 4,814,221 | * | 3/1989 | Utsumi | 428/220 |
| 5,374,467 | * | 12/1994 | Sato | 428/143 |
| 5,545,364 | * | 8/1996 | Song et al. | 264/210.5 |
| 5,731,071 | * | 3/1998 | Etchu et al. | 428/220 |

* cited by examiner

*Primary Examiner*—Vivian Chen
(74) *Attorney, Agent, or Firm*—Dike, Bronstein, Roberts & Cushman, LLP; David G. Conlin

(57) ABSTRACT

The present invention relates to a capacitor installed in the automobile engine room, comprising polyethylene-2,6-naphthalate film comprising polyethylene-2,6-naphthalate with an intrinsic viscosity (IV) of not less than 0.56 and having a degree of crystallinity of 32 to 42%, the film elongation retention after a 3,000-hour degradation test at 170° C. being not less than 50%, and the residual elongation of the film after said test being not less than 30%.

4 Claims, No Drawings

POLYETHYLENE-2,6-NAPHTHALATE FILM FOR CAPACITOR

BACKGROUND OF THE INVENTION

The present invention relates to a polyethylene-2,6-naphthalate film for capacitor. More particularly, it relates to a polyethylene-2,6-naphthalate film for capacitor having excellent heat resistance, moisture resistance and electrical properties and capable of use in the automobile engine room.

Film capacitors are generally manufactured by a method in which a base film such as a biaxially oriented polyethylene terephthalate film or a biaxially oriented polypropylene film and a thin film of a metal such as aluminum are placed one over another and rolled up, a method in which a deposited film of a metal such as aluminum or zinc is formed by vapor metallization on the surface of the said base film and then rolled up or laminated, or method in which a rolled up element is crushed to form a flat-shaped element. Recently, with the request for miniaturization and reducing the thickness of the electrical or electronic circuits, efforts for miniaturization or packaging (mounting) of the capacitors have been made, too. In their applications to the automobiles, the use environment of the capacitors is not limited to the driving cab but is expanded to a high temperature and high humidity situation as in the engine room.

It has been required that a dielectric material used for capacitors can show a large dielectric constant, a less change in properties depending upon temperature or frequency, a high insulation resistance and a good stability even when exposed to various environmental conditions. However, many of the conventional dielectric materials exhibit a moisture absorption property and, therefore, tends to be frequently deteriorated due to the moisture absorbed.

In the conventional capacitors, it is necessary to enclose or package the capacitor in an appropriate outer sheath or casing such as metal casings for preventing any moisture from entering thereinto. Subsequently, when resins capable of showing a high moisture resistance have been developed, resin-dipped type capacitors have been prevalently used instead of the packaged-type ones.

In association with a recent tendency for miniaturization and surface-mounting of capacitors, it has been required to reduce the thickness thereof. Upon reducing the thickness of the capacitors, it is necessary to assure good properties thereof even when the capacitors are simply packaged without dipping in resin. Further, it has been required to provide films for the capacitors which not only show an excellent durability to various environmental conditions upon use such as ambient temperature, humidity or vibration, but also have stable electric characteristics.

For example, electric control units for automobiles have been conventionally disposed at as large a distance as possible from engine to avoid adverse influences thereon. However, due to recent tendency of weight-reduction and high efficiency of automobiles, these units tend to be arranged in close proximity to the engine. As a result, it has also been required that films used in these units are excellent in heat resistance, moisture resistance and durability to vibration or the like. Since polyethylene-2,6-naphthalate films have a higher glass transition temperature and a higher Young's modulus than those of ordinarily used polyethylene terephthalate films, it is expected that when such polyethylene-2,6-naphthalate films are used in capacitors, the temperature range in which the capacitors are usable, can be broadened up to an elevated temperature. However, in specific applications such as upon mounting onto automobiles or the like, in order to obtain capacitors having an excellent durability to severe environmental conditions upon use and a high reliability, it has been strongly demanded to provide films therefor which can show stable dielectric properties, i.e., are excellent in dielectric constant and dielectric loss to impart a high dielectric breakdown voltage thereto. Further, such films used for surface-mounting capacitors have also been required to withstand a high temperature, a high humidity, vibration or the like. Especially, it is necessary that the surface-mounting capacitors exhibit a high moisture resistance and a high heat resistance without any outer sheath in order to achieve miniaturization and small thickness thereof.

For the solution of the problem of heat resistance, a method has been proposed in which intrinsic viscosity and refractive index of the film are properly controlled, but by this method, the above request has not been satisfied.

As a result of the present inventors' earnest studies to solve the above problem, it has been found that a film capacitor made by using a polyethylene-2,6-naphthalate film having the specific properties is suitable for use in the automobile engine room.

The present invention has been attained on the basis of the above finding.

SUMMARY OF THE INVENTION

The object of the present invention is to provide a film for capacitor installed in the automobile engine room, which film is improved in dielectric breakdown strength and mechanical properties and capable of maintaining its dielectric and mechanical properties at the high level even when used under the severe environments.

To attain the above aim, in an aspect of the present invention, there is provided a capacitor installed in the automobile engine room, comprising polyethylene-2,6-naphthalate film comprising polyethylene-2,6-naphthalate with an intrinsic viscosity (IV) of not less than 0.56 and having a degree of crystallinity of 32 to 42%, the film elongation retention after a 3,000-hour degradation test at 170° C. being not less than 50%, and the residual elongation of the film after said test being not less than 30%.

DETAILED DESCRIPTION OF THE INVENTION

The present invention is described in detail below.

The "polyethylene naphthalate film for capacitor" according to the present invention is a film which is mainly constituted by the ethylene-2,6-naphthalate units, and which may be modified by a small quantity, such as not more than 10 mol %, preferably not more than 5 mol % of a third component. It should be noted, however, that increase of the content of the copolymerization component may lead to deterioration of heat resistance, mechanical properties and durability under high humidity credited to the polyethylene-2,6-naphthalate film.

Examples of the third components usable in the present invention include carboxylic acids such as adipic acid, oxalic acid, sebacic acid, isophthalic acid, terephthalic acid, naphthalene-2,7-dicarboxylic acid, naphthalene-1,5-dicarboxylic acid and cyclohexanedicarboxylic acid, and glycols such as diethylene glycol, propylene glycol, tetraethylene glycol and polyethylene glycol.

Polyethylene naphthalate can be produced from a known process which comprises polycondensing naphthalene-2,6-dicarboxylic acid or its functional derivative, such as dimethyl naphthalene-2,6-dicarboxylate, and ethylene glycol in the presence of a catalyst under the appropriate reaction conditions.

In order to better film workability in the manufacture of the capacitor, it is preferable to contain the fine inert particles in the polyethylene naphthalate so as to improve slip characteristics of the film.

For containing the inert particles in the polyethylene naphthalate, there can be used either the precipitation method or the addition method. The precipitation method is a method in which in the course of the polyester production process, a phosphorus compound or the like is acted to the metal compound staying dissolved in the reaction system, for example, the metal compound remaining dissolved in the system after ester exchange reaction, to make the fine particles precipitate. This method is preferred because few coarse particles are formed. According to the addition method, the fine inert particles are blended in the polyethylene-2,6-naphthalate preparation at an appropriate stage in the process form the polyester producing step to the extrusion step before film formation.

Examples of the fine inert particles to be added include the particles of silicon oxide, titanium oxide, zeolite, silicon nitride, boron nitride, cerite, alumina, calcium carbonate, magnesium carbonate, barium carbonate, calcium sulfate, barium sulfate, calcium phosphate, lithium phosphate, magnesium phosphate, lithium fluoride, aluminum oxide, silicon oxide, titanium oxide, kaolin, talc, carbon black, silicon nitride, boron nitride, silicon particles, etc., and other organic particles such as crosslinked acryl particles and crosslinked polystyrene particles. The shape of these particles is not specified; it may be, for instance, spherical, lumpish or flat plate-like. Also, two or more types of particles may be used in admixture.

The average size (diameter) of the particles used and their amount to be added may be properly selected in consideration of surface roughness (to be described later) of the film to be produced, but preferably the average particle diameter of the particles is 0.01 to 3 $\mu$m, while the amount to be added is preferably 0.05 to 1% by weight based on the polyethylene-2,6-naphthalate. Since the coarse particles tend to cause defective insulation, especially trouble in the pressing step in the manufacture of the capacitor, it is preferable that there are contained no coarse particles with a size more than 5 $\mu$m, more preferably more than 3 $\mu$m. In order to remove such coarse particles, it is preferable that the inert particles used in the present invention is rendered into a slurry with a solvent such as ethylene glycol, dispersed by a medium stirring type disperser such as sand grinder or an ultrasonic disperser, and then classified by a wet classifier or passed through a filter.

If the degree of polymerization of the polyethylene-2,6-naphthalate used in the present invention is too low in polymerization degree, not only mechanical properties may be deteriorated but also durability may be lowered, deterioration of mechanical properties may be quickened, initial value of dielectric breakdown voltage at high temperatures may be reduced, and deterioration of properties at high temperatures may be hastened. It is, therefore, essential that the intrinsic viscosity of the film is not less than 0.56, preferably not less than 0.60, more preferably not less than 0.65. If the intrinsic viscosity of the film is less than 0.56, there takes place not only a reduction of initial dielectric breakdown voltage of the capacitor but also a large drop of film elongation when left under high temperatures, resulting in a fall of dielectric breakdown strength of the produced film capacitor and wide scatter of capacity. When the intrinsic viscosity of the film is more than 0.60, especially more than 0.65, the elongation retention and residual elongation of the film under high temperatures are enlarged to further better durability of the film. If the intrinsic viscosity of the film exceeds 0.70, however, the melt viscosity of the starting polyethylene naphthalate tends to rise, making it difficult to conduct extrusion.

For increasing the intrinsic viscosity of the film, it is possible to conduct heat treatment of the polymer or solid phase polymerization under reduced pressure or in an inert gas atmosphere at a temperature below the melting point of the polymer. It is also preferable to set the extrusion temperature at a low level to shorten the residence time so as not to reduce the intrinsic viscosity of the film.

The degree of crystallinity of the film according to the present invention is in the range of 32 to 42%. If the degree of crystallinity there of is less than 32%, the film may have poor dimensional stability and the electrode treatment in the manufacture of the film capacitor becomes unstable, resulting in an enlarged variation of electrical properties of the produced capacitors. If the film crystallinity exceeds 42%, the produced capacitor becomes vulnerable to the change of mechanical properties when left under a high temperature for a long time, and also tends to lower in dielectric breakdown strength due to such factors as cracking under vibratory forces and occurrence of defects attributable to high crystallinity.

Regarding heat durability of the film of the present invention, it is essential that the film elongation retention after the 3,000-hour degradation test at 170° C. is not less than 50% and its residual elongation is not less than 30%. If the elongation retention after the said test is less than 50%, the deterioration rate of the film when exposed to a high temperature is intolerably high. If the residual elongation of the film is less than 30%, the film itself becomes frail, lacks flexibility and tends to crack on receiving vibratory forces, causing a drop of dielectric breakdown strength and capacity of the produced capacitor.

The surface roughness (SRa) of the film of the present invention is preferably 0.020 to 0.080 $\mu$m, more preferably 0.030 to 0.070 $\mu$m. If SRa is less than 0.020 $\mu$m, the film is too flat and the problem may arise in relation to its workability in the metallization step and film winding step, deformation in the capacitor heat treatment step and pressing step, and adhesion of the films to each other, resulting in wide scatter of the capacitor capacity. On the other hand, if SRa exceeds 0.080 $\mu$m, unevenness of the film surface becomes too large, and when a capacitor is made by using these films, there may take place positional shifting between the individual films or instability of their dielectric properties due to the presence of air between the film layers, causing a reduction of dielectric breakdown voltage.

As to the coarse particles on the film surface, the number of coarse protrusions showing fourth or higher-order interference is usually not more than 7 per $mm^2$. Preferably, the number of coarse protrusions showing fifth or higher-order interference is not more than 1 per $mm^2$ and those showing fourth or higher-order interference is not more than 7 per $mm^2$. When the number of coarse protrusions on the film surface which show a fourth or higher-order interference, is more than 5 per $mm^2$, the laminated film tends to be damaged upon press, resulting in increase in BDV defect of the capacitor.

The rate of shrinkage in the longitudinal direction of the film of the present invention, as measured after 30-minute heating at 150° C., is usually 1.0 to 3%, and that in the transverse direction, as measured under the same conditions, is usually 0.1 to 2.0%. A film which satisfies these requirements is preferred for use for coiled capacitors. If the longitudinal shrinkage rate of the film at 150° C. is less than 1.0%, the clamping force in capacitor working tends to weaken, resulting in scatter of capacity and dielectric loss of the produced capacitors. If the longitudinal shrinkage rate exceeds 3%, the sectional shape of the capacitor may become non-uniform. On the other hand, if the transverse shrinkage rate is less than 0.1% or exceeds 2.0%, the loss in the electrode end treatment tends to increase, which may make it unable to obtain a capacitor with stabilized dielectric properties.

The shrinkage percentage of the film according to the present invention when exposed to 200° C. for 30 minutes, is preferably not more than 6%, and the difference between shrinkage percentages in longitudinal and transverse directions is preferably not more than 3%. Those films capable of satisfying the above requirements can be preferably used as films for surface-mounting capacitors. When the shrinkage percentage is more than 6%, the film is deteriorated in dimensional stability, resulting in large change in capacity of the obtained capacitor. When the difference in shrinkage percentages in longitudinal and transverse directions is more than 3%, the obtained film capacitor is non-uniform in cross section, and tends to show a large loss upon treatment for forming the end faces for electrodes. As a result, it is not possible to obtain a capacitor having stable dielectric properties.

When the rise temperature for tan $\delta$ in $\alpha$-dispersion due to micro-Brawnian motion of the main chain of the compound constituting the film according to the present invention, is not more than 110° C. and the value of tan $\delta$ is not more than 0.14, the film can show a less temperature rise and a less change or fluctuation in dielectric constant and capacity of the capacitor.

The leakage current on the surface of the film is considered to flow through voids around particles, impurities and crystal interfaces. The temperature at which the leakage current is increased is preferably not less than 150° C. When the temperature at which the leakage current is increased is less than 150° C., the capacitor undergoes a large change in IR at a high temperature or at a high voltage, resulting in deteriorated durability thereof.

The thickness of the film according to the present invention is preferably not more than 10 $\mu$m, more preferably in the range of 5 to 2 $\mu$m, in view of the rated voltage and capacitor capacity needed in application to automobiles and the request for smaller size and weight.

According to the present invention, by satisfying the above conditions, especially the essential requirements of the present invention, the dielectric breakdown voltage retention of the capacitor after a 3,000-hour degradation test at 170° C. can be made more than 50%, or even more than 60%. Particularly in uses where the electrical parts are used under the vehement vibratory and high-temperature conditions and therefore their high reliability is required, as in applications to automobiles, it is imperative to minimize deterioration of the properties even under the severe use conditions.

A process for producing the film of the present invention is described in detail below, but it should be understood that the following is merely an embodiment of the invention and in no way limitative to the scope of the present invention.

Polyethylene-2,6-naphthalate containing the fine particles, produced from solution polymerization or solid phase polymerization, is dried and extruded into a sheet from an extruder at 280 to 320° C., and the extrudate is cooled and solidified to give a substantially non-oriented unstretched sheet. In melt extrusion, it is preferable to pass the molten material through a filter, if necessary a multi-stage filter, before extruded. Also, in cooling and solidification of the extrudate, it is preferable to apply an electrostatic pinning method for effecting close adhesion to the casting drum.

The thus obtained unstretched sheet is first stretched 3 to 6 times, preferably 3.5 to 5.0 times, in the machine direction (longitudinal direction) usually at 120 to 170° C. Then, after once cooled to a temperature below the glass transition temperature of the polymer, or without such cooling, the sheet is preheated usually at 120 to 170° C. and stretched 4 to 5 times in the transverse direction at the substantially same temperature. The resulting biaxially stretched film is heat set usually at a temperature within the range of 180 to 250° C.

Stretching in the first axial direction is preferably conducted in two or more stages as such multi-stage operation provides better thickness uniformity. Also, after transverse stretching, the film may be re-stretched in the machine direction. In either case, it is preferable to perform stretching so that the overall stretch ratio in the machine direction will become 3.5 times or more. Further, in order to obtain the specific shrink properties mentioned above, the film is relaxed usually 1 to 20%, preferably 2 to 10%, in the machine or transverse direction in, for example, the heat treatment step in the film producing process. The shrink properties may be improved by elevating the heat treatment temperature in the film producing process, but this method may not be preferable as it may adversely affect the electrical properties of the polyester. A too high heat treatment temperature causes an excessive increase of film density, making it unable to obtain the high-grade electrical properties. It also causes a notable deterioration of mechanical and electrical properties under high temperatures, giving rise to the problem of poor durability. It is also preferable that the film forming operations be carried out using such equipment that can inhibit mixing of the residual polymer or foreign matter into the feedstock drying means, extruder and filter, and which can also prevent the floating dust (of the oligomers, etc.) in the film forming chamber from depositing on the stretching rolls and film carriage rolls.

In this way, there can be obtained according to the present invention a polyethylene-2,6-naphthalate film having more stabilized dielectric breakdown strength and dielectric properties than the hitherto known films, and such a film can be advantageously applied to the manufacture of coiled capacitors with high heat resistance.

The polyethylene-2,6-naphthalate film according to the present invention is minimized in change of mechanical properties in use under high temperatures, and is high in heat resistance, and the capacitors produced by using this film are small in reduction of dielectric breakdown voltage, stabilized in dielectric properties and high in reliability. Thus, the present invention is of high industrial value.

EXAMPLES

The present invention is further explained by reference to the following examples, but it should be noted that these examples are merely intended to be illustrative and not to be construed as limiting the scope of the invention. The property values of the films obtained in the examples were determined by the following methods.

(1) Intrinsic viscosity [η] (dl/g)

One gram of the polymer was dissolved in 100 ml of a 50/50 (by weight) mixed solvent of phenol/tetrachloroethane, and the viscosity of the solution was measured at 30° C.

(2) Rate of heat shrinkage (%)

Each produced film was cut into a 30 mm wide and 100 cm long test piece (sample) and heat treated under no tension for 30 minutes in an oven set to a predetermined temperature. The lengths of the sample before and after the heat treatment were measured, and the rate of heat shrinkage was calculated from the following equation:

Rate of heat shrinkage=((Sample length before heat treatment−sample length after heat treatment)/(Sample length before heat treatment))×100

Measurement was made at 5 points in both longitudinal direction and transverse direction of the film, and the average of the 5 measurements was shown.

(3) Crystallinity

The film density was determined by the density gradient tube method using a mixed solution of n-heptane and carbon tetrachloride. Measurement was made at 25° C. Crystallinity was determined from the following equation on the supposition that the density of the amorphous polyethylene-2,6-naphthalate was 1.325 and that of the perfectly crystallized polyethylene-2,6-naphthalate was 1.407.

Crystallinity (%)=((ρ−1.325)/(1.407−1.325))×100 (ρ:determined density (g/cc) of the film)

(4) Measurement of residual elongation

A 50 mm long and 15 mm wide test piece of film was attached to the test piece holder of a rotational thermostatically controlled oven GPH-102 (mfd. by TABAI ESPEC CORP.), and a degradation accelerated test was conducted at 170° C.

For determining residual elongation after the degradation test, the test piece was pulled at a speed of 200 m/min in a chamber controlled to 23° C. and 50% RH by using a tensile tester Model 2001 by International Technology & Science Corporation, and the elongation at break was read and calculated as the amount of elongation based on the length before measurement.

(5) Elongation retention (%)

This was calculated from the following equation using the determined value of elongation after the degradation test.

Elongation retention=((Elongation after degradation test)/Elongation before degradation))×100

Elongation retention after 3,000 hours was determined by the method of least squares from the data of the time of degradation at 4 points centering around the 3,000-hour point. Five test pieces were collected for both directions, and the average of 5 measurements was shown.

(6) Center line surface average roughness (SRa)

This was determined in the following way using a surface roughness meter Micromap 512 (by Micromap Co., Ltd.). A film portion with an area SM was extracted from the roughness curved surface to the center plane of the obtained film. The X axis and Y axis of the orthogonal coordinate system were located on the center plane of the extracted portion, and with the axis orthogonal to the center plane being expressed as Z axis, the value given from the following equation was shown in unit of $\mu$m.

$$SRa = \frac{1}{SM}\int_0^{Lx}\int_0^{Ly}|f(x, y)|dxdy$$

$$(Lx \times Ly = SM)$$

Measurement was made 15 times for the area of 375 $\mu$m×320 $\mu$m, and the average of the 15 measurements was shown.

(7) Number of coarse protrusions:

After aluminum was vapor-deposited on the surface of the film, the number of protrusions thereon were measured by sampling 10 portions each having an area of 10 mm×10 mm and scanning the whole surface thereof in the width direction of the film, using a two-beam interference microscope. When measured at a wavelength of 0.54 $\mu$m, protrusions showing a fourth-order interference were determined as those having a maximum protrusion height of not less than 1.1 $\mu$m and less than 1.4 $\mu$m, and protrusions showing a fifth or higher-order interference were determined as those having a maximum protrusion height of no less than 1.4 $\mu$m. The numbers of respective kinds of coarse protrusions per unit area were calculated from the above-measured numbers of the protrusions on the surface of the film.

(8) Evaluation of leakage current:

It is considered that a leakage current on the surface of the film is caused due to voids around particles, defects, boundaries between crystal and amorphous phases, impurities, ion implantation and the like. The leakage current on the surface of the film was evaluated using TSC/RMA (manufactured by Solomat) capable of accurately measuring even a very small amount of current.

The electrode having a diameter of 7.5 mm$\phi$ was used in the measurement. The film was heated to 200° C. without applying any voltage thereto and then cooled. Thereafter, the film was heated again at a heating rate of 7° C./min. while applying a voltage of 200 V/mm thereto, thereby determining the temperature at which the leakage current was abruptly increased.

(9) Dielectric properties (dielectric constant and dielectric loss tangent):

Aluminum was vacuum-deposited onto both surfaces of the film. Further, a main electrode, a counter electrode and a guard electrode w were respectively formed on the film to prepare a test sample. The test sample was measured at a frequency of 60 Hz and at a temperature rise rate of a high-temperature vessel of 1° C./min. using a wide-band dielectric loss measuring device (TR-1 Model, manufactured by Ando Denki Co., Ltd.) to determine the change in dielectric loss tangent depending upon temperature.

(10) Electrical properties of the capacitor

A capacitor was made in the manner described below, and the changes of its dielectric loss and static capacity were measured.

Manufacture of capacitor (1)

Using a resistance heating type metallizing apparatus, with the pressure in the vacuum chamber being adjusted to be below $10^{-4}$ Torr, a roll of film was unwound, aluminum was metallized on its surface to a thickness of 450 Å, and then the film was again rolled up. Aluminum was deposited in the form of stripes having a margin in the longitudinal direction of the polyester film (recurrence of 8 mm wide deposited portion and 1 mm wide margin).

The thus obtained deposited film was slit into a 4.5 mm wide tape-like strip having a 0.5 mm wide margin on the left or right side. One piece of this deposited polyester film having a left-side margin and another one having a right-side margin were joined and rolled up. Two pieces of film were rolled up with a shift relative to each other so that the deposited portion would protrude by a length of 0.5 mm in the width direction. This roll of film was pressed under the conditions of 50 kg/cm² and 140° C. for 5 minutes. The pressed roll was metal sprayed on both sides thereof and then lead wires were attached thereto, after which there were formed a layer impregnated with a liquid bisphenol A epoxy resin and a sheath with a minimal thickness of 0.5 mm by heat fusing a powdery epoxy resin, thereby making a film capacitor.

Manufacture of capacitor (2) (manufacture of miniaturization capacitor for surface-mounting)

The deposited film obtained by the same way as defined in the manufacture of capacitor (1) was was slit into a 4.5 mm wide tape-like strip having a 0.5 mm wide margin on the left or right side. One piece of this deposited polyester film having a left-side margin and another one having a right-side margin were joined and rolled up. Two pieces of film were rolled up with a shift relative to each other so that the deposited portion would protrude by a length of 0.5 mm in the width direction. This roll of film was pressed under the conditions of 75 kg/cm² and 140° C. for 5 minutes to prepare thin rectanguler capacitor. The pressed roll was metal sprayed on both sides thereof, thereby making a miniaturization capacitor for surface-mounting.

1) Change of electrostatic capacity

The obtained capacitor was left in an atmosphere of 70° C. and 95% RH for 1,000 hours while applying a DC voltage of 60 V/μm across the capacitor electrodes, and the rate of change of electrostatic capacity was determined with the initial electrostatic capacity as reference. The value obtained by deducting the initial electrostatic capacity from the electrostatic capacity after 1,000-hour standing was divided by the initial electrostatic capacity, and the quotient was expressed by percent.

The capacitor samples whose rate of change of electrostatic capacity was less than 7% were regarded as acceptable.

2) Capacitor dielectric breakdown voltage retention

The metallic baskets containing 100 pieces of said capacitor were placed in the rotary frame of a rotational thermostatically controlled oven GHP-102 (mfd. by TABAI ESPEC CORP.) and subjected to a degradation accelerated test while giving vibrations to the baskets. Dielectric breakdown voltage was determined by collecting samples from each metallic basket periodically at a predetermined time interval, applying DC voltage across both electrodes at a rate of 100 V/sec starting from 0V, and measuring the voltage which caused dielectric breakdown. Retention was calculated from the following equation:

Dielectric breakdown voltage retention (%)=((Dielectric breakdown voltage after degradation test)/(Dielectric breakdown voltage before degradation))×100

Retention after 3,000 hours of degradation test was determined by the method of least squares after measuring retention at four points centering around the 3,000-hour point. The average of measurements on the 100 test pieces was shown. The capacitor samples which showed dielectric breakdown voltage retention of 50% or higher were regarded as acceptable.

3) Percentage of dielectric breakdown number (%)

The obtained capacitor was placed in the frame of a thermostatically controlled oven GHP-102 (mfd. by TABAI ESPEC CORP., setting temperature=125° C.) and DC voltage of 200 V was applied thereto. The change of leaking current was measured by a digital multimeter. When the leaking current was not less than 0.5 mA, it was evaluated that dielectric breakdown was taken place on the capacitor. After 3000 hours testing, the number of dielectric breakdown capacitor was counted and the percentage of dielectric breakdown pieces in 25 test pieces was calculated as (%).

Example 1

Preparation of polyethylene naphthalate 100 parts of dimethyl naphthalene-2,6-dicarboxylate, 65 parts of ethylene glycol and 0.09 part of magnesium acetate used as ester exchange catalyst were subjected to ester exchange reaction in the usual way, and then 0.5 part of SYLYSIA (average particle size: 1.2 μm) dispersed in ethylene glycol was added. Then 0.04 part of antimony trioxide was added as polymerization catalyst to carry out polycondensation reaction in the usual way to obtain a polymer having an intrinsic viscosity of 0.55, which was then further subjected to solid phase polymerization in a nitrogen stream to finally obtain polyethylene-2,6-naphthalate having an intrinsic viscosity of 0.63.

Production of polyethylene naphthalate film

The above polymer was dried by a 180° C. dryer, supplied into an extruder for melting and kneading at 295° C., extruded from a slit die in the form of a sheet onto a 40° C. cooling drum and rapidly cooled thereby using the electrostatic pinning method to obtain an amorphous sheet. This sheet was stretched 4.2 times in the machine direction at 140° C. and 4.2 times in the transverse direction at 142° C. by a cleaned longitudinal stretcher and a tenter, respectively. The resulting film was heat treated at 230° C. for 3 seconds to give a biaxially oriented film having a thickness of 3.3 μm. The properties of the obtained film and the electrical properties of the miniaturization capacitor for surface-mounting produced by using this film were evaluated. The results are shown in Table 1. As is seen from Table 1, all the properties determined of this film measured up to the object of the present invention, and the capacitor produced by using this film had excellent properties.

Comparative Example 1

Polyethylene-2,6-naphthalate having an intrinsic viscosity of 0.57, produced in the same way as in Example 1, was used as starting material for forming a sheet according to the procedure of Example 1, and this sheet was stretched 4.0 times in the machine direction at 140° C. and 4.0 times in the transverse direction at 142° C. by a cleaned longitudinal stretcher and a tenter, respectively. The resulting film was heat treated at 240° C. for 3 seconds to give a biaxially oriented film having a thickness of 3.3 μm. The results of evaluation of the properties of this film and the capacitor produced by using this film are shown in Table 1. However, the properties of the capacitor was poor and did not satisfy the object of the present invention because the stability of capacity (large variation of capacity) was poor and the dielectric breakdown thereof frequently took place.

Examples 2 and 3

Polyethylene-2,6-naphthalate having an intrinsic viscosity of 0.55, obtained in the same way as in Example 1 except that particles having the average particle size of 1.0 μm, in which cource particles having the particle size of not less than 3.0 μm was removed, was used. The above-mentioned polyethylene-2,6-naphthalate was subjected to solid phase polymerization in a nitrogen stream so that the final polymer would have an intrinsic viscosity of 0.63 (Example 2), 0.65 (Example 3).

The biaxially oriented film was obtained by the same way as defined in Example 1. The film thicknesses were 3.3 μm (Example 2) and 2.1 μm (Example 3), respectively. The properties of the obtained film and the electrical properties of the miniaturization capacitor for surface-mounrting produced by using this film are shown in Table 1.

Example 4

Preparation of polyethylene naphthalate 100 parts of dimethyl naphthalene-2,6-dicarboxylate, 65 parts of ethylene glycol and 0.09 part of magnesium acetate used as ester exchange catalyst were subjected to ester exchange reaction in the usual way, and then 0.5 part of SYLYSIA (average particle size: 1.2 μm) dispersed in ethylene glycol was added. Then 0.04 part of antimony trioxide was added as polymerization catalyst to carry out polycondensation reaction in the usual way to obtain a polymer having an intrinsic viscosity of 0.55, which was then further subjected to solid phase polymerization in a nitrogen stream to finally obtain polyethylene-2,6-naphthalate having an intrinsic viscosity of 0.63.

Production of polyethylene naphthalate film

The above polymer was dried by a 180° C. dryer, supplied into an extruder for melting and kneading at 295° C., extruded from a slit die in the form of a sheet onto a 40° C. cooling drum and rapidly cooled thereby using the electrostatic pinning method to obtain an amorphous sheet. This sheet was stretched 4.5 times in the machine direction at 140° C. and 4.0 times in the transverse direction at 142° C. by a cleaned longitudinal stretcher and a tenter, respectively. The resulting film was heat treated at 230° C. for 3 seconds to give a biaxially oriented film having a thickness of 3.7 μm. The properties of the obtained film and the electrical properties of the capacitor using this film produced by the above-mentioned method of manufacture of capacitor (1) were evaluated. The results are shown in Table 1. As is seen from Table 1, all the properties determined of this film measured up to the object of the present invention, and the capacitor produced by using this film had excellent properties.

Comparative Example 2

Polyethylene-2,6-naphthalate having an intrinsic viscosity of 0.57, produced in the same way as in Example 1, was used as starting material for forming a sheet according to the procedure of Example 1, and this sheet was stretched by the same procedure as defined in Example 1. The resulting film was heat treated at 210° C. for 3 seconds to give a biaxially oriented film having a thickness of 3.7 μm. The results of evaluation of the properties of this film and the capacitor produced by using this film are shown in Table 2.

Examples 5 to 9

Polyethylene-2,6-naphthalate having an intrinsic viscosity of 0.55, obtained in the same way as in Example 4, was subjected to solid phase polymerization in a nitrogen stream so that the final polymer would have an intrinsic viscosity of 0.63 (Example 5), 0.68 (Example 6) or 0.76 (Example 7).

As for the film extrusion temperature, the temperature of the resin extruded from the slit die was measured and the die-head temperature was adjusted to 310° C. (Example 5), 313° C. (Example 6) and 320° C. (Example 7). The film forming operation was conducted under the conditions capable of minimizing heat deterioration of the film while preventing reduction of intrinsic viscosity.

As for Examples 8 and 9, the films were obtained in the same way as in Example 2 except that the added particle concentration was changed to 0.1% (Example 8) and 0.8% (Example 9).

The film heat treatment temperatures are shown in Table 1. In Examples 6 and 7, the rate of shrinkage in the transverse direction was adjusted by a relaxation treatment (2% relaxation in Example 6 and 3% relaxation in Example 7) at 180° C. in a tenter.

Comparative Examples 3 to 5

The biaxially oriented films were produced under the conditions shown in Table 2 by using a polymer with an intrinsic viscosity of 0.63 obtained in the same way as in Example 2 (Comparative Example 3), a polymer with an intrinsic viscosity of 0.68 in which the added particle concentration was adjusted to 1.0% (Comparative Example 4), and a polymer with the same intrinsic viscosity as above in which the added particle concentration was adjusted to 0.5% (Comparative Example 5). The properties of the obtained films and the electrical properties of the capacitors produced by using these films are shown in Table 2.

The results obtained in the above Examples and Comparative Examples are collectively shown in Tables 1 and 2.

TABLE 1

|  | Example | | | Comp. Example |
|---|---|---|---|---|
|  | 1 | 2 | 3 | 1 |
| Film intrinsic viscosity | 0.56 | 0.57 | 0.58 | 0.5 |
| Crystallinity (%) | 36 | 39 | 39 | 39 |
| Residual elongation (%) | 57 | 52 | 53 | 7 |
| Elongation retention (%) | 45 | 35 | 37 | 2 |
| SRa (μm) | 0.052 | 0.047 | 0.041 | 0.056 |
| Heat shrinkage (150° C.) | | | | |
| Machine direction (MD) | 1.9 | 1.1 | 1.2 | 1.7 |
| Transverse direction (TD) | 0.6 | 0.2 | 0.1 | 0.9 |
| Number of fourth or higher-order protrusion (number/mm$^2$) | 4.8 | 2.1 | 3.8 | 5.2 |
| Heat shrinkage (200° C.) | | | | |
| Machine direction (MD) | 4.5 | 4.3 | 3.4 | 2.2 |
| Transverse direction (TD) | 2.3 | 2.1 | 1.2 | 0.8 |
| Difference (MD-TD) | 2.2 | 2.2 | 2.2 | 1.4 |
| Peak temperature of dielectric loss tangent δ | 148 | 150 | 150 | 140 |
| Temperature of increasing leaking current | 185 | 195 | 200 | 165 |
| Percentage of dielectric breakdown number (%) | 8 | 4 | 8 | 40 |
| Variation of capacity (%) | 2 | 1.5 | 3.5 | 4.5 |

|  | Example | | | | | |
|---|---|---|---|---|---|---|
|  | 4 | 5 | 6 | 7 | 8 | 9 |
| Film intrinsic viscosity | 0.56 | 0.56 | 0.65 | 0.68 | 0.56 | 0.56 |
| Crystallinity (%) | 36 | 34 | 40 | 33 | 36 | 36 |
| Residual elongation (%) | 55 | 60 | 70 | 75 | 57 | 55 |
| Elongation retention (%) | 42 | 48 | 55 | 64 | 43 | 43 |
| Dielectric breakdown voltage retention (%) | 60 | 55 | 65 | 70 | 57 | 53 |
| Variation of | −3 | −2 | −2 | −5 | −7 | −6 |

TABLE 1-continued

| capacity (%) | | | | | | |
|---|---|---|---|---|---|---|
| SRa (μm) | 0.05 | 0.05 | 0.05 | 0.05 | 0.02 | 0.08 |
| Heat shrinkage (150° C.) | | | | | | |
| Machine direction (MD) | 2 | 2.5 | 1.7 | 2.5 | 2 | 2 |
| Transverse direction (TD) | 0.7 | 1.5 | 0.7 | 0.7 | 0.7 | 0.7 |
| Number of fourth or higher-order protrusion (number/mm²) | 20 | 22 | 21 | 20 | 9 | 58 |
| Heat shrinkage (200° C.) | | | | | | |
| Machine direction (MD) | 4.3 | 8.7 | 1.6 | 9.3 | 5.2 | 4.5 |
| Transverse direction (TD) | 2.6 | 7.5 | 0.2 | 7.7 | 2.5 | 2.5 |
| Difference (MD-TD) | 1.7 | 1.2 | 1.4 | 1.6 | 2.7 | 2.0 |

TABLE 2

| | Comparative Example | | | |
|---|---|---|---|---|
| | 2 | 3 | 4 | 5 |
| Film intrinsic viscosity | 0.56 | 0.56 | 0.65 | 0.56 |
| Crystallinity (%) | 31 | 30 | 43 | 43 |
| Residual elongation (%) | 10 | 65 | 30 | 20 |
| Elongation retention (%) | 8 | 56 | 23 | 14 |
| Dielectric breakdown voltage retention (%) | 35 | 40 | 45 | 49 |
| Variation of capacity (%) | −10 | −13 | −15 | −18 |
| SRa (μm) | 0.05 | 0.05 | 0.09 | 0.065 |
| Heat shrinkage (150° C.) | | | | |
| Machine direction (MD) | 4.1 | 5.1 | 2.5 | 0.5 |
| Transverse direction (TD) | 2.3 | 2 | 0.7 | 0.1 |
| Number of fourth or higher-order protrusion (number/mm²) | 22 | 20 | 78 | 31 |
| Heat shrinkage (200° C.) | | | | |
| Machine direction (MD) | 10.7 | 15.2 | 1.1 | 1.0 |
| Transverse direction (TD) | 8 | 9 | 0.1 | 0.1 |
| Difference (MD-TD) | 2.7 | 6.2 | 1.0 | 0.9 |

As is apparent from Table 2, the films of the Comparative Examples were large in change by heat deterioration and the capacitors produced by using these films were low in dielectric breakdown voltage retention and also unstable and widely scattered in dielectric properties, indicating that these films are unfit for reliable application to the capacitors.

What is claimed is:

1. A capacitor installed in the automobile engine room, comprising polyethylene-2,6-naphthalate film comprising polyethylene-2,6-naphthalate with an intrinsic viscosity (IV) of not less than 0.56 and having a degree of crystallinity of 32 to 42%, the film elongation retention after a 3,000-hour degradation test at 170° C. being not less than 50%, and the residual elongation of the film after said test being not less than 30%.

2. A capacitor according to claim 1, wherein the surface roughness (SRa) of the film is 0.020 to 0.080 μm, and the rate of shrinkage at 150° C. in the longitudinal direction is 1 to 3% and the rate of shrinkage at 150° C. in the transverse direction is 0.1 to 2%.

3. A capacitor according to claim 1, wherein the number of coarse protrusions showing fourth or higher-order interference on the film surface is not more than 7 per mm².

4. A capacitor according to claim 1, wherein the shrinkage percentage of the film when exposed to 200° C. for 30 minutes, is not more than 6%, and the difference between shrinkage percentages in longitudinal and transverse directions is not more than 3%.

* * * * *